(12) United States Patent
Rajagopalan et al.

(10) Patent No.: US 8,903,974 B2
(45) Date of Patent: Dec. 2, 2014

(54) METHODS, SYSTEMS, AND COMPUTER READABLE MEDIA FOR USER CONTROLLED POLICY SHARING

(75) Inventors: Sundaram Rajagopalan, Waltham, MA (US); Peter J. Marsico, Chapel Hill, NC (US)

(73) Assignee: Tekelec, Inc., Morrisville, NC (US)

( * ) Notice: Subject to any disclaimer, the term of this patent is extended or adjusted under 35 U.S.C. 154(b) by 528 days.

(21) Appl. No.: 13/244,237

(22) Filed: Sep. 23, 2011

(65) Prior Publication Data
US 2012/0084371 A1    Apr. 5, 2012

Related U.S. Application Data

(60) Provisional application No. 61/390,159, filed on Oct. 5, 2010.

(51) Int. Cl.
| | | |
|---|---|---|
| G06F 15/173 | (2006.01) | |
| G06F 15/16 | (2006.01) | |
| H04L 12/24 | (2006.01) | |
| H04M 15/00 | (2006.01) | |
| H04L 29/08 | (2006.01) | |
| H04W 28/20 | (2009.01) | |
| H04W 28/24 | (2009.01) | |
| H04L 12/14 | (2006.01) | |

(52) U.S. Cl.
CPC ........... *H04L 41/0893* (2013.01); *H04W 28/20* (2013.01); *H04W 28/24* (2013.01); *H04L 12/1407* (2013.01); *H04L 41/5029* (2013.01); *H04L 41/5054* (2013.01); *H04L 41/0896* (2013.01); *H04M 15/66* (2013.01); *H04M 15/78* (2013.01); *H04M 15/781* (2013.01); *H04M 15/783* (2013.01); *H04L 67/303* (2013.01)

USPC .......................................... 709/223; 709/228

(58) Field of Classification Search
CPC ... H04L 12/1407; H04W 28/24; H04W 28/20
USPC ................................................. 709/223, 228
See application file for complete search history.

(56) References Cited

U.S. PATENT DOCUMENTS

| 3,917,915 | A | 11/1975 | Karras |
| 4,162,377 | A | 7/1979 | Mearns |

(Continued)

FOREIGN PATENT DOCUMENTS

| EP | 0 088 639 | 9/1983 |
| EP | 0 212 654 | 5/1987 |

(Continued)

OTHER PUBLICATIONS

Non-Final Office Action for U.S. Appl. No. 13/402,756 (May 10, 2013).

(Continued)

*Primary Examiner* — Hieu Hoang
(74) *Attorney, Agent, or Firm* — Jenkins, Wilson, Taylor & Hunt, P.A.

(57) ABSTRACT

According to one aspect, the subject matter described herein includes a method for user controlled policy sharing. The method includes receiving, from a first user device, a request to share with a second user device a policy attribute associated with the first user device. The method also includes generating a signaling message containing instructions to modify the policy attribute. The method further includes communicating the signaling message to a policy control function associated with the second user device.

27 Claims, 6 Drawing Sheets

(56) References Cited

U.S. PATENT DOCUMENTS

| | | |
|---|---|---|
| 4,191,860 A | 3/1980 | Weber |
| 4,310,727 A | 1/1982 | Lawser |
| 4,313,035 A | 1/1982 | Jordan et al. |
| 4,385,206 A | 5/1983 | Bradshaw et al. |
| 4,754,479 A | 6/1988 | Bicknell et al. |
| 4,756,020 A | 7/1988 | Fodale |
| 4,769,834 A | 9/1988 | Billinger et al. |
| 4,788,718 A | 11/1988 | McNabb et al. |
| 4,897,835 A | 1/1990 | Gaskill et al. |
| 4,897,870 A | 1/1990 | Golden |
| 4,959,849 A | 9/1990 | Bhusri |
| 4,972,461 A | 11/1990 | Brown et al. |
| 5,008,929 A | 4/1991 | Olsen et al. |
| 5,150,357 A | 9/1992 | Hopner et al. |
| 5,291,481 A | 3/1994 | Doshi et al. |
| 5,315,580 A | 5/1994 | Phaal |
| 5,341,608 A | 8/1994 | Mains, Jr. |
| 5,402,474 A | 3/1995 | Miller et al. |
| 5,426,688 A | 6/1995 | Anand |
| 5,430,709 A | 7/1995 | Galloway |
| 5,438,570 A | 8/1995 | Karras et al. |
| 5,457,692 A | 10/1995 | Ishinabe et al. |
| 5,457,729 A | 10/1995 | Hamann et al. |
| 5,473,596 A | 12/1995 | Garafola et al. |
| 5,475,732 A | 12/1995 | Pester, III |
| 5,506,893 A | 4/1996 | Buscher et al. |
| 5,521,902 A | 5/1996 | Ferguson |
| 5,539,804 A | 7/1996 | Hong et al. |
| 5,546,398 A | 8/1996 | Tucker et al. |
| 5,550,914 A | 8/1996 | Clarke et al. |
| 5,572,579 A | 11/1996 | Orriss et al. |
| 5,579,371 A | 11/1996 | Aridas et al. |
| 5,583,926 A | 12/1996 | Venier et al. |
| 5,586,177 A | 12/1996 | Farris et al. |
| 5,592,530 A | 1/1997 | Brockman et al. |
| 5,598,464 A | 1/1997 | Hess et al. |
| 5,602,909 A | 2/1997 | Carkner et al. |
| 5,606,600 A | 2/1997 | Elliott |
| 5,610,969 A | 3/1997 | McHenry et al. |
| 5,610,977 A | 3/1997 | Williams et al. |
| 5,625,681 A | 4/1997 | Butler, II |
| 5,689,555 A | 11/1997 | Sonnenberg |
| 5,696,816 A | 12/1997 | Sonnenberg |
| 5,712,908 A | 1/1998 | Brinkman et al. |
| 5,740,239 A | 4/1998 | Bhagat et al. |
| 5,757,895 A | 5/1998 | Aridas et al. |
| 5,764,745 A | 6/1998 | Chan et al. |
| 5,768,352 A | 6/1998 | Elliott et al. |
| 5,768,358 A | 6/1998 | Venier et al. |
| 5,771,284 A | 6/1998 | Sonnenberg |
| 5,774,532 A | 6/1998 | Gottlieb et al. |
| 5,784,443 A | 7/1998 | Chapman et al. |
| 5,796,813 A | 8/1998 | Sonnenberg |
| 5,802,145 A | 9/1998 | Farris et al. |
| 5,812,639 A | 9/1998 | Bartholomew et al. |
| 5,867,558 A | 2/1999 | Swanson |
| 5,903,726 A | 5/1999 | Donovan et al. |
| 5,949,871 A | 9/1999 | Kabay et al. |
| 5,999,525 A | 12/1999 | Krishnaswamy et al. |
| 6,009,160 A | 12/1999 | Sonnenberg |
| 6,021,126 A | 2/2000 | White et al. |
| 6,028,914 A | 2/2000 | Lin et al. |
| 6,091,957 A | 7/2000 | Larkins et al. |
| 6,091,959 A | 7/2000 | Souissi et al. |
| 6,094,573 A | 7/2000 | Heinonen et al. |
| 6,097,719 A | 8/2000 | Benash et al. |
| 6,108,332 A | 8/2000 | Kasiviswanathan |
| 6,108,782 A | 8/2000 | Fletcher et al. |
| 6,111,946 A | 8/2000 | O'Brien |
| 6,115,754 A | 9/2000 | Landgren |
| 6,119,014 A | 9/2000 | Alperovich et al. |
| 6,128,304 A | 10/2000 | Gardell et al. |
| 6,128,377 A | 10/2000 | Sonnenberg |
| 6,134,307 A | 10/2000 | Brouckman et al. |
| 6,134,314 A | 10/2000 | Dougherty et al. |
| 6,134,316 A | 10/2000 | Kallioniemi et al. |
| 6,134,432 A | 10/2000 | Holmes et al. |
| 6,138,023 A | 10/2000 | Agarwal et al. |
| 6,181,937 B1 | 1/2001 | Joensuu |
| 6,182,086 B1 | 1/2001 | Lomet et al. |
| 6,188,752 B1 | 2/2001 | Lesley |
| 6,208,872 B1 | 3/2001 | Schmidt |
| 6,215,790 B1 | 4/2001 | Voit et al. |
| 6,219,551 B1 | 4/2001 | Hentilä et al. |
| 6,249,572 B1 | 6/2001 | Brockman et al. |
| 6,252,952 B1 | 6/2001 | Kung et al. |
| 6,272,136 B1 | 8/2001 | Lin et al. |
| 6,301,609 B1 | 10/2001 | Aravamudan et al. |
| 6,304,565 B1 | 10/2001 | Ramamurthy |
| 6,321,268 B1 | 11/2001 | Dillon et al. |
| 6,324,183 B1 | 11/2001 | Miller et al. |
| 6,333,931 B1 | 12/2001 | LaPier et al. |
| 6,363,411 B1 | 3/2002 | Dugan et al. |
| 6,373,930 B1 | 4/2002 | McConnell et al. |
| 6,393,269 B1 | 5/2002 | Hartmaier et al. |
| 6,424,621 B1 | 7/2002 | Ramaswamy et al. |
| 6,430,176 B1 | 8/2002 | Christie, IV |
| 6,438,223 B1 | 8/2002 | Eskafi et al. |
| 6,446,127 B1 | 9/2002 | Schuster et al. |
| 6,453,034 B1 | 9/2002 | Donovan et al. |
| 6,453,158 B2 | 9/2002 | Donovan et al. |
| 6,456,708 B1 | 9/2002 | Copley et al. |
| 6,466,796 B1 | 10/2002 | Jacobson et al. |
| 6,470,179 B1 | 10/2002 | Chow et al. |
| 6,480,588 B1 | 11/2002 | Donovan |
| 6,496,690 B1 | 12/2002 | Cobo et al. |
| 6,510,164 B1 | 1/2003 | Ramaswamy et al. |
| 6,515,997 B1 | 2/2003 | Feltner et al. |
| 6,516,194 B2 | 2/2003 | Hanson |
| 6,535,727 B1 | 3/2003 | Abbasi et al. |
| 6,564,261 B1 | 5/2003 | Gudjonsson et al. |
| 6,571,094 B1 | 5/2003 | Begeja et al. |
| 6,584,183 B2 | 6/2003 | Manto |
| 6,611,516 B1 | 8/2003 | Pirkola et al. |
| 6,633,764 B1 | 10/2003 | Garcia |
| 6,718,178 B1 | 4/2004 | Sladek et al. |
| 6,747,970 B1 | 6/2004 | Lamb et al. |
| 6,760,343 B1 | 7/2004 | Krishnamurthy et al. |
| 6,801,781 B1 | 10/2004 | Provost et al. |
| 6,856,676 B1 | 2/2005 | Pirot et al. |
| 6,963,583 B1 | 11/2005 | Foti |
| 6,968,052 B2 | 11/2005 | Wullert, II |
| 7,058,036 B1 | 6/2006 | Yu et al. |
| 7,738,891 B2 * | 6/2010 | Tenhunen et al. ............. 455/512 |
| 8,305,922 B2 | 11/2012 | Cuervo |
| 8,331,229 B1 | 12/2012 | Hu et al. |
| 8,620,263 B2 | 12/2013 | Ravishankar et al. |
| 8,681,622 B2 | 3/2014 | Chatterjee et al. |
| 2001/0031641 A1 | 10/2001 | Ung et al. |
| 2001/0034224 A1 | 10/2001 | McDowell et al. |
| 2002/0029189 A1 | 3/2002 | Titus et al. |
| 2002/0058507 A1 | 5/2002 | Valentine et al. |
| 2002/0111153 A1 | 8/2002 | Hartmaier et al. |
| 2002/0150079 A1 | 10/2002 | Zabawskyj et al. |
| 2003/0026289 A1 | 2/2003 | Mukherjee et al. |
| 2003/0031160 A1 | 2/2003 | Gibson Ang et al. |
| 2003/0037108 A1 | 2/2003 | Peiffer et al. |
| 2003/0177281 A1 | 9/2003 | McQuillan et al. |
| 2003/0203740 A1 | 10/2003 | Bahl et al. |
| 2004/0003037 A1 | 1/2004 | Fujimoto et al. |
| 2004/0153506 A1 | 8/2004 | Ito et al. |
| 2004/0166878 A1 | 8/2004 | Erskine et al. |
| 2004/0213393 A1 | 10/2004 | Bedingfield et al. |
| 2004/0233840 A1 | 11/2004 | Bye |
| 2004/0240638 A1 | 12/2004 | Donovan |
| 2005/0027867 A1 | 2/2005 | Mueller et al. |
| 2005/0070310 A1 | 3/2005 | Caspi et al. |
| 2005/0202836 A1 | 9/2005 | Schaedler et al. |
| 2006/0053197 A1 * | 3/2006 | Yoshimura et al. ........... 709/206 |
| 2006/0291488 A1 | 12/2006 | Naqvi et al. |
| 2007/0185809 A1 | 8/2007 | Duan |
| 2009/0207730 A1 | 8/2009 | Stamoulis et al. |
| 2009/0225719 A1 * | 9/2009 | Zhi et al. ....................... 370/329 |
| 2009/0245108 A1 * | 10/2009 | Wu et al. ....................... 370/233 |

(56) References Cited

U.S. PATENT DOCUMENTS

| | | |
|---|---|---|
| 2009/0327112 A1 | 12/2009 | Li et al. |
| 2010/0137002 A1 | 6/2010 | Agarwal et al. |
| 2010/0161802 A1 | 6/2010 | Tofighbakhsh et al. |
| 2010/0184403 A1 | 7/2010 | Cai et al. |
| 2010/0287121 A1 | 11/2010 | Li et al. |
| 2011/0003579 A1 | 1/2011 | Cai et al. |
| 2011/0158090 A1 | 6/2011 | Riley et al. |
| 2011/0170411 A1* | 7/2011 | Wang et al. ............ 370/235 |
| 2011/0170412 A1 | 7/2011 | Ramadas et al. |
| 2011/0208853 A1 | 8/2011 | Castro-Castro et al. |
| 2011/0217979 A1 | 9/2011 | Nas |
| 2011/0231540 A1 | 9/2011 | Tai et al. |
| 2011/0246586 A1 | 10/2011 | Steele |
| 2011/0307790 A1 | 12/2011 | Pandya et al. |
| 2011/0317557 A1* | 12/2011 | Siddam et al. ........... 370/232 |
| 2012/0026947 A1 | 2/2012 | Miller et al. |
| 2012/0034900 A1 | 2/2012 | Agarwal |
| 2012/0052866 A1 | 3/2012 | Froehlich et al. |
| 2012/0059943 A1* | 3/2012 | Castro et al. ............ 709/227 |
| 2012/0094685 A1 | 4/2012 | Marsico |
| 2012/0096139 A1 | 4/2012 | Cackowski et al. |
| 2012/0099715 A1 | 4/2012 | Ravishankar et al. |
| 2012/0100849 A1 | 4/2012 | Marsico |
| 2012/0129488 A1 | 5/2012 | Patterson et al. |
| 2012/0140632 A1 | 6/2012 | Norp et al. |
| 2012/0163297 A1 | 6/2012 | Agarwal et al. |
| 2012/0176894 A1 | 7/2012 | Cai et al. |
| 2012/0220330 A1 | 8/2012 | Goldner et al. |
| 2012/0233325 A1* | 9/2012 | Zhou et al. ............ 709/224 |
| 2012/0257499 A1 | 10/2012 | Chatterjee et al. |
| 2013/0017803 A1 | 1/2013 | Li et al. |
| 2013/0036215 A1 | 2/2013 | Kupinsky et al. |

FOREIGN PATENT DOCUMENTS

| | | |
|---|---|---|
| EP | 0 258 654 | 3/1988 |
| EP | 0 264 023 | 4/1988 |
| EP | 1 100 279 A2 | 5/2001 |
| GB | 2 382 267 | 5/2003 |
| WO | WO 84/01073 | 3/1984 |
| WO | WO 86/03915 | 7/1986 |
| WO | WO 88/00419 | 1/1988 |
| WO | WO 99/14910 | 3/1999 |
| WO | WO 00/16583 | 3/2000 |
| WO | WO 00/35155 A1 | 6/2000 |
| WO | WO 01/20920 A1 | 3/2001 |
| WO | WO 97/33441 | 3/2001 |
| WO | WO 01/56308 A2 | 8/2001 |
| WO | WO 2006/031678 A2 | 3/2006 |
| WO | WO 2012/021344 A2 | 2/2012 |
| WO | WO 2013/126057 A1 | 8/2013 |

OTHER PUBLICATIONS

Non-Final Office Action for U.S. Appl. No. 13/274,936 (May 1, 2013).

Non-Final Office Action for U.S. Appl. No. 13/277,626 (Feb. 27, 2013).

"3rd Generation Partnership Project; Technical Specification Group Services and System Aspects; Telecommunication management; Charging management; Diameter charging applications (Release 9)," 3GPP TS 32.299 V9.4.0, pp. 1-148 (Jun. 2010).

3GPP, "Digital Cellular Telecommunications System (Phase 2+); Universal Mobile Telecommunications System (UMTS); Universal Subscriber Identity Module (USIM) Application Toolkit (USAT) (3GPP TS 31.111 version 8.3.0 Release 8)," ETSI TS 131 111 V8.3.0, pp. 1-102 (Oct. 2008).

"BICC Architecture and BICC Protocol Details," Tekelec, p. 28-41 (2008).

"BICC Signaling Router (BSR) Reference Architecture (WP005274)," Tekelec, p. 2-91 (2008).

Jennings et al., "Session Initiation Protocol (SIP) URIs for Application such as Voicemail and Interactive Voice Response (IVR)," The Internet Society, RFC 4458 (Apr. 2006).

"Interworking Between Session Initiation Protocol (SIP) and Bearer Independent Call Control Protocol or ISDN User Part," ITU-T Q. 1912.5, p. 1-101 (Mar. 2004).

"Prepaid vs. Number Portability," Power Point presentation (publication date unknown; electronic file creation date Jul. 29, 2003).

"Bearer Independent Call Bearer Control Protocol," ITU-T Q.1950, p. 1-96 (Dec. 2002).

Chang, "BICC Extension of SIP in Inter-Network Configuration," Internet Engineering Task Force, draft-chang-sipping-bicc-network-00.txt, pp. 1-17 (Mar. 2002).

Marshall et al., "SIP Extensions for Supporting Distributed Call State," SIP Working Group, Internet Draft, pp. 1-12 (Aug. 2001).

"Bearer Independent Call Control Protocol (Capability Set 2) and Signalling System No. 7 ISDN User Part: Formats and Codes," ITU-T Q.1902.3, p. 1-141 (Jul. 2001).

"Bearer Independent Call Control Protocol (Capability Set 2) and Signaling System No. 7 ISDN user part: General Functions of Messages and Parameters," ITU-T Q.1902.2 (Jul. 2001).

"Bearer Independent Call Control Protocol (Capability Set 2): Functional Description," ITU-T Q.1902.1, p. 1-23 (Jul. 2001).

"Bearer Independent Call Control Protocol," ITU-T Q.1901 (Jun. 2000).

Sugano et al., "Presence Information Data Format for IMPP," Internet draft, draft-ietf-impp-pidf-01.text, Network Working Group, pp. 1-17 (Mar. 10, 2000).

Liao et al., "SS7-TCAP/IP Interworking," Internet Engineering Task Force, pp. 1-14 (Mar. 1999).

De Ment, "The Evolution of Signaling," NMS Communications, p. 1-28 (Publication Date Unknown).

"Mobile Wireless Overview," Cisco IOS Mobile Wireless Configuration Guide, pp. MWC-1-MWC-8 (Publication Date Unknown).

Advisory Action Before the Filing of an Appeal Brief for U.S. Appl. No. 13/402,756 (Dec. 30, 2013).

Final Office Action for U.S. Appl. No. 13/274,936 (Nov. 15, 2013).

Notice of Allowance and Fee(s) Due for U.S. Appl. No. 13/330,086 (Nov. 6, 2013).

Final Office Action for U.S. Appl. No. 13/402,756 (Sep. 19, 2013).

Notice of Allowance and Fee(s) Due for U.S. Appl. No. 13/277,626 (Aug. 20, 2013).

Notification of Transmittal of the International Search Report and the Written Opinion of the International Searching Authority, or the Declaration for International Application No. PCT/US2012/026178 (Jul. 30, 2012).

Commonly-assigned, co-pending International Application No. PCT/US12/26178 for "Methods, Systems, and Computer Readable Media for Network Metadata Based Policy Control," (Unpublished, filed Feb. 22, 2012).

Commonly-assigned, co-pending U.S. Appl. No. 13/402,756 for "Methods, Systems, and Computer Readable Media for Network Metadata Based Policy Control," (Unpublished, filed Feb. 22, 2012).

"About 3GPP: What is the difference between a SIM and a USIM? What is a UICC?," About http://www.3gpp.org/FAQ#outil_sommaire_58, pp. 1-11 (Copyright 2012).

"Smart Cards; Card Application Toolkit (CAT) (Release 10)," ETSI TS 102 223 V10.5.0, pp. 1-224 (Sep. 2011).

"3rd Generation Partnership Project; Technical Specification Group Services and System Aspects; Universal Geographical Area Description (GAD) (Release 10)," 3GPP TS 23.032, pp. 1-29 (Mar. 2011).

"3rd Generation Partnership Project; Technical Specification Group Core Network and Terminals; Policy and Charging Control over Rx reference point (Release 9)," 3GPP TS 29.214 V9.3.0, pp. 1-44 (Mar. 2010).

"3rd Generation Partnership Project; Technical Specification Group Core Network and Terminals; Policy and Charging Control over Gx reference point (Release 9)," 3GPP TS 29.212 V9.2.0, pp. 1-111 (Mar. 2010).

\* cited by examiner

METHODS, SYSTEMS, AND COMPUTER READABLE MEDIA FOR USER CONTROLLED POLICY SHARING

PRIORITY CLAIM

This application claims the benefit of U.S. Provisional Patent Application Ser. No. 61/390,159, filed Oct. 5, 2010; the disclosure of which is incorporated herein by reference in its entirety.

TECHNICAL FIELD

The subject matter described herein relates to user controlled policy sharing. More specifically, the subject matter relates to methods, systems, and computer readable media for user controlled policy sharing.

BACKGROUND

As telecommunication technology evolves, an increasing number of applications are available to users. Many of these applications (e.g., video on demand) utilize substantial network resources, particularly bandwidth. The utilization of such applications creates an ever increasing demand on the limited resources of telecommunications providers. In order to manage such resource demands, telecommunications providers often employ network policies to limit resource utilization. Employing a policy scheme allows a network provider to offer its most demanding users, who may be willing to pay greater service charges, the high quality of service (QoS) required by such resource-hungry applications. Additionally, policy schemes may help to ensure reliable service for all network users, who absent such policy schemes, might be adversely affected by the disproportionate utilization of network resources by users of such resource-hungry applications.

Another problem with existing network architectures is that there is no mechanism for user controlled sharing of policy attributes. For example, one user may have reserved but unused network bandwidth. There is currently no mechanism for the user to initiate sharing of the unused bandwidth with another user.

Accordingly, a need exists for methods, systems, and computer readable media for user controlled policy sharing.

SUMMARY

According to one aspect, the subject matter described herein includes a method for user controlled policy sharing. The method includes receiving, from a first user device, a request to share with a second user device a policy attribute associated with the first user device. The method also includes generating a signaling message containing instructions to modify the policy attribute. The method further includes communicating the signaling message to a policy control function associated with the second user device.

According to another aspect, the subject matter described herein includes a system for user controlled policy sharing. The system includes a communication interface. The system also includes a policy sharing module. The policy sharing module is configured to receive, from a first user device and via the communication interface, a request to share with a second user device a policy attribute associated with the first user device. The policy sharing module is also configured to generate a signaling message containing instructions to modify the policy attribute. The policy sharing module is further configured to communicate, via the communication interface, the signaling message to a policy control function associated with the second user device.

As used herein, the term "node" refers to a physical computing platform including one or more processors and memory.

As used herein, the terms "function" or "module" refer to software in combination with hardware (such as a processor) and/or firmware for implementing features described herein.

The subject matter described herein can be implemented in software in combination with hardware and/or firmware. For example, the subject matter described herein may be implemented in software executed by one or more processors. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory computer readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

Figure 1:
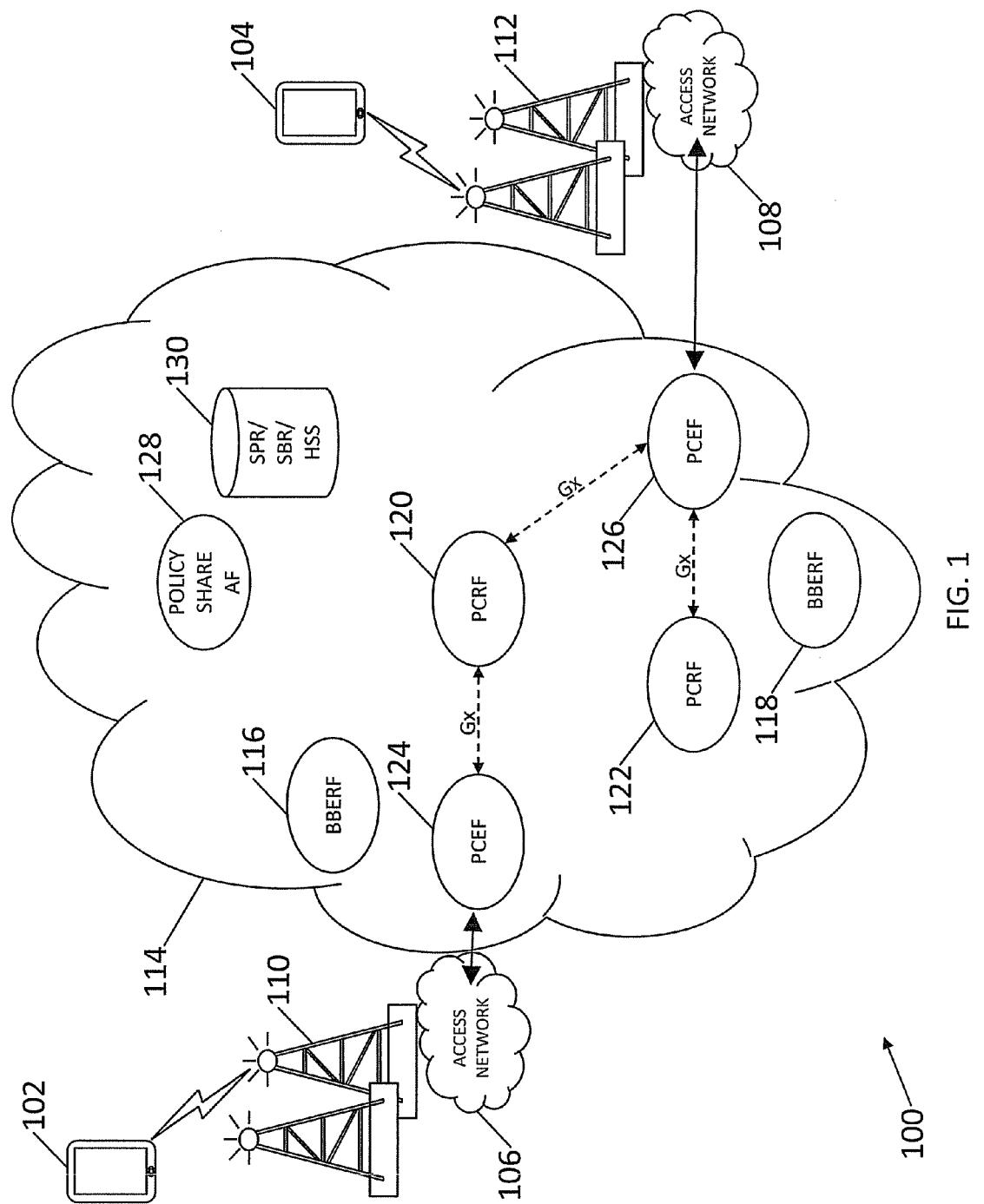
FIG. 1 is a network diagram illustrating an exemplary network environment for user controlled policy sharing according to an embodiment of the subject matter described herein.

Methods, systems, and computer readable media for user controlled policy sharing are provided. FIG. 1 is a network diagram illustrating an exemplary network environment for user controlled policy sharing according to an embodiment of the subject matter described herein. Referring to FIG. 1, network environment 100 may include one or more user equipment (UE) nodes. UE nodes may include any device(s) through which a subscriber may access one or more applications and/or services provided by network environment 100, and may include tablet computers, laptop computers, pagers, mobile phones, smartphones, wireless modems, and other devices through which a subscriber may access applications and/or services provided by network environment 100. For example, network environment 100 may include UE 102 and UE 104. Network environment 100 may include one or more access networks, which may include nodes, functions, devices, and/or components for providing UE 102 and/or UE 104 access to applications, services, functions, or devices in one or more networks. For example, network environment 100 may include access networks 106 and 108. In one embodiment, access network 106 and/or access network 108 may be a radio access network (RAN). For example, access network 106 and/or access network 108 may be a global system for mobile communications (GSM) RAN (GRAN), a general packet radio service (GPRS) access network, a universal mobile telecommunications system (UMTS) RAN (UTRAN), an evolved UTRAN (eUTRAN), an Internet protocol (IP) connectivity access network (IPCAN), a code division multiple access (CDMA) network, an evolution-data optimized (EV-DO) network, a wideband CDMA (WCDMA) network, a high speed packet access (HPSA) network, an evolved HPSA (EHPSA+) network, or a long term evolution (LTE) access network. Access network 106 and/or access network 108 may include one or more receiver/transceiver nodes for wirelessly communicating with UE 102 and/or UE 104. For example, access network 106 may include receiver/transceiver nodes 110 for wirelessly communicating with UE 102 and access network 108 may similarly include receiver/transceiver nodes 112 for wirelessly communicating with UE 104.

Network environment 100 may include one or more carrier networks. For example, network environment 100 may include carrier network 114. Carrier network 114 may include one or more bearer binding and event reporting function (BBERF) nodes, which may coordinate delivery of data to and from UE(s), and may be, for example, a service gateway (SGW) or a serving general packet radio service (GPRS) support node (SGSN). For example, carrier network 114 may include BBERF nodes 116 and 118, which may respectively coordinate delivery of data to and from UE 102 and UE 104. Carrier network 114 may include one or more policy control function nodes, which may be, for example, resource admission control subsystem (RACS) nodes and/or policy and charging rules function (PCRF) nodes. PCRF nodes may serve as central policy decision points within network environment 100 and may aid one or network operators associated with network environment 100 in making real-time, subscriber specific, policy decisions that may be utilized to provide varying levels of QoS. For example, carrier network 114 may include PCRF nodes 120 and 122, which may serve as central policy decision points within network environment 100 for UE 102 and UE 104. In some embodiments, PCRF node 120 may serve as the policy control function for UE 102 and UE 104. In some embodiments, PCRF node 120 may serve as the policy control function for UE 102 and PCRF node 122 may serve as the policy control function for UE 104.

As policy decision points for carrier network 114, PCRF nodes 120 and/or 122 may take operator defined service policies, subscription information pertaining to a user, and other data into account to build policy decisions. Policy decisions may be formulated as policy control and charging (PCC) rules, for example, Gx rules contained in credit control messages. PCC rules may contain information about user plane traffic expressed as a service data flow (SDF) or packet filter. A packet filter may take the form of an Internet protocol (IP) five-tuple specifying: (1) source IP address(es), (2) destination IP address(es), (3) source port number(s), (4) destination port number(s), and (5) application protocol(s) (e.g., transmission control protocol (TCP), user datagram protocol (UDP)). All IP packets matching a packet filter of a PCC rule may be designated an SDF.

Flow-based charging models may provide operators associated with network environment 100 with the ability to gate (e.g., allow/block), charge, or vary QoS for SDFs identified by SDF filters according to specified policy control and charging rules. PCC rules may contain information that allows the filtering of traffic to identify packets belonging to a particular SDF (e.g., IP multimedia subsystem (IMS), file transfer protocol (FTP), browsing) and allow an operator to define how a particular SDF is to be charged (e.g., different media streams within a single packet data protocol (PDP) context.) PCC rules may be requested by a policy and charging enforcement function (PCEF) node (e.g., by a packet data network (PDN) gateway in an evolved packet system (EPS)), at bearer establishment, upon a specified trigger event, and/or upon bearer termination. Such a request may be made using a Gx reference point towards a PCRF. PCC rules may specify one or more QoS policy attributes, for example, a guaranteed download bit rate, a minimum download bit rate, a maximum download bit rate, a permitted SDF, a permitted QoS class, a permitted access point name (APN), a permitted destination IP address, and a download quota.

Carrier network 114 may include one or more policy enforcement function nodes, which may be PCEF nodes, and may be placed in line between one or more access networks and one or more PCRF nodes. For example, carrier network 114 may include PCEF nodes 124 and 126, which may respectively be placed in line between access networks 106 and 108 and PCRF nodes 120 and 122. PCEF nodes 124 and 126 may be, for example, gateway GPRS support nodes (GGSN) or PDN gateways. As policy enforcement points, PCEF nodes 124 and 126 may request and receive policy rules from PCRF nodes 120 and 122 via, for example, the Gx interface.

In accordance with embodiments of the subject matter described herein, carrier network 114 may include a policy sharing module for user controlled policy sharing. In some embodiments, a policy sharing module may be included as part of a policy sharing application function (AF) node. For example, carrier network 114 may include policy sharing AF node 128 for user controlled policy sharing. In some embodiments, a policy sharing module may be included as part of one or more policy control function nodes. For example, PCRF node 120 and/or PCRF node 122 may include a policy sharing module for user controlled policy sharing. In some embodiments, a policy sharing module may be operative to communicate with one or more of a subscription profile repository (SPR), a subscription binding repository (SBR), and a home subscriber server (HSS), any of which may contain information that may be utilized to identify a policy control function associated with a particular subscriber or UE node. For example, carrier network 114 may include SPR/SBR/HSS node 130 and one or more of policy sharing AF node 128, PCRF node 120, and PCRF node 122 may be operative to communicate with SPR/SBR/HSS node 130 to obtain information that may be utilized to identify a policy control function associated with UE 102 and/or UE 104.

In accordance with embodiments of the subject matter described herein, a user of network environment 100 may utilize a policy sharing module to share a policy attribute (e.g., SDF gating policy attribute, QoS policy attribute, charging policy attribute, etc.) with another user of network environment 100. For example, UE 102 may be associated with a policy that provides a guaranteed minimum bandwidth for streaming video from a specific provider (e.g., a premium subscription). A user of UE 102 may desire to share a video from the specified provider with a user of UE 104. UE 104, however, may not be associated with a policy that provides guaranteed minimum bandwidth, and thus may be unable to view the video either entirely or in a satisfactory manner. Accordingly, the user of UE 102 may desire to "share" a policy attribute associated with UE 102 (e.g., the guaranteed minimum bandwidth for streaming video from the specified provider) with UE 104, enabling UE 104's user to view the video in a satisfactory manner. In accordance with embodiments of the subject matter described herein, UE 102's user may utilize a policy sharing module to share such a policy attribute with UE 104.

Figure 2:
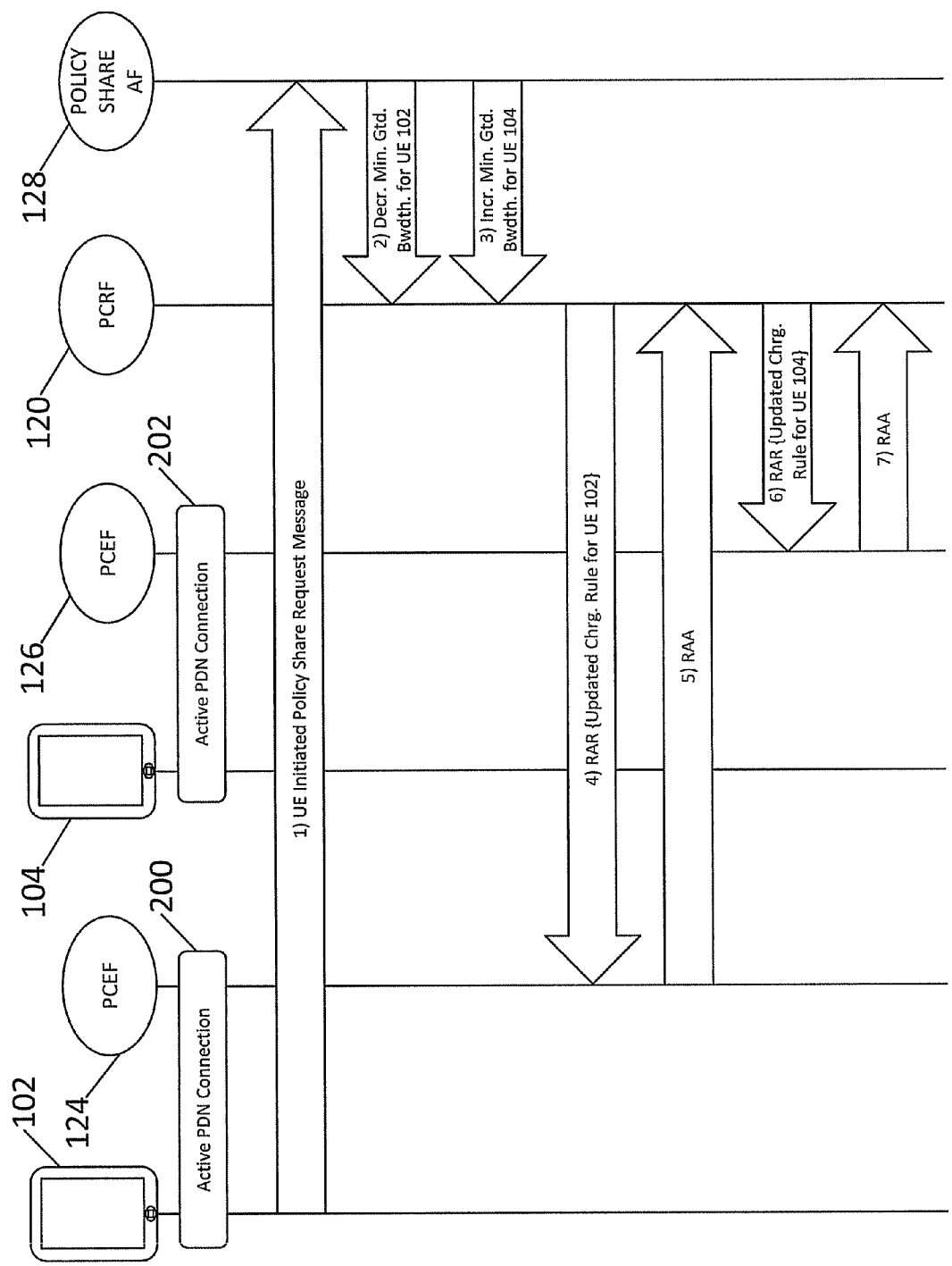
FIG. 2 is a message flow diagram illustrating an exemplary message sequence in which policy sharing is performed by a policy sharing application function node for user controlled policy sharing according to an embodiment of the subject matter described herein.

FIG. 2 is a message flow diagram illustrating an exemplary message sequence in which policy sharing is performed by a policy sharing application function node for user controlled policy sharing according to an embodiment of the subject matter described herein. Referring to FIG. 2, active packet data network (PDN) connection 200 may exist between UE 102 and PCEF node 124. Similarly, active PDN connection 202 may exist between UE 104 and PCEF node 126. As explained above with reference to FIG. 1, a user of UE 102 may desire to "share" a policy attribute associated with UE 102 (e.g., the guaranteed minimum bandwidth for streaming video from the specified provider) with UE 104, enabling UE 104's user to view the video in a satisfactory manner. At step 1, UE 102 may generate and communicate to policy sharing AF node 128, which may include a policy sharing module (not illustrated in FIG. 2), a UE initiated policy share request message. The policy share request message may be one or more of a short message service (SMS) message, a multimedia messaging service (MMS) message, an instant message, an email message, a Diameter message, an extensible markup language (XML) message, a session initiation protocol (SIP) message, a simple object access protocol (SOAP) message, or any other message suitable to convey the policy sharing request. The policy sharing module of policy sharing AF node 128 may receive the policy share request message and may begin the process of sharing the policy attribute requested. In some embodiments, the policy sharing module of AF node 128 may be configured to determine whether one or more of UE 102 and UE 104 is permitted to share the policy attribute. Such a determination may be made, for example, based on determining whether one or more of UE 102 and UE 104 are associated with a predetermined network operator. In some embodiments, the policy sharing module of AF node 128 may determine whether one or more of UE 102 and UE 104 are associated with a predetermined network operator by determining whether a mobile network code (MNC) portion of an international mobile subscriber identity (IMSI) respectively associated with UE 102 or UE 104 is associated with the predetermined network operator.

At step 2, the policy sharing module of policy sharing AF node 128 may generate and communicate to a policy control function associated with UE 102 (e.g., PCRF node 120) a signaling message instructing the policy control function to modify the policy attribute (e.g., to decrease the guaranteed minimum bandwidth for streaming video from the specified provider for UE 102). At step 3, the policy sharing module of policy sharing AF node 128 may generate and communicate to a policy control function associated with UE 104 (e.g., PCRF node 120) a signaling message instructing the policy control function to modify the policy attribute (e.g., to increase the guaranteed minimum bandwidth for streaming video from the specified provider for UE 104). In some embodiments, the policy sharing module of AF node 128 may be configured to generate the signaling message in response to having first determined that one or more of UE 102 and UE 104 are permitted to share the policy attribute. It is appreciated that the policy control function associated with UE 102 will not necessarily be the same as the policy control function associated with UE 104 (e.g., UE 102 and UE 104 may be associated with distinct PCRF nodes). In some embodiments, the policy sharing module of policy sharing AF node 128 may take steps (not illustrated) to update accounting and/or billing records to reflect the requested policy share between UE 102 and UE 104.

The policy control function associated with UE 102 (e.g., PCRF node 120) may receive the signaling message and, at step 4, may generate and communicate to a policy enforcement function associated with UE 102 (e.g., PCEF node 124) a PCC rule, via for example a re-auth request (RAR) message, that modifies the policy attribute (e.g., a rule for decreasing the guaranteed minimum bandwidth for streaming video from the specified provider for UE 102). In some embodiments the PCC rule may be configured to expire after a predetermined time period. At step 5, the policy enforcement function associated with UE 102 (e.g., PCEF node 124) may acknowledge receiving the PCC rule by generating and communicating to the policy control function associated with UE 102 (e.g., PCRF node 120) an acknowledgement message, for example, a re-auth answer (RAA) message.

Similarly, the policy control function associated with UE 104 (e.g., PCRF node 120) may receive the signaling message and, at step 6, may generate and communicate to a policy enforcement function associated with UE 104 (e.g., PCEF node 126) a PCC rule, via for example an RAR message, that modifies the policy attribute (e.g., a rule for increasing the guaranteed minimum bandwidth for streaming video from the specified provider for UE 104). In some embodiments the PCC rule may be configured to expire after a predetermined time period. At step 7, the policy enforcement function associated with UE 104 (e.g., PCEF node 126) may acknowledge receiving the PCC rule by generating and communicating to the policy control function associated with UE 104 (e.g., PCRF node 120) an acknowledgement message, for example, an RAA message. It is appreciated that the policy enforcement function associated with UE 102 need not be distinct from the policy enforcement function associated with UE 104 (e.g., UE 102 and UE 104 may both utilize the same PCEF node).

The policy enforcement function(s) associated with UE 102 and UE 104 (e.g., PCEF node 124 and PCEF node 126), having received PCC rules for modifying the policy attribute, may accordingly adjust the policy attribute for each of UE 102 and UE 104 as specified by the PCC rules (e.g., decrease the guaranteed minimum bandwidth for streaming video from the specified provider for UE 102 and increase the guaranteed minimum bandwidth for streaming video from the specified provider for UE 104), effectively "sharing" a policy attribute associated with UE 102 with UE 104.

Figure 3:
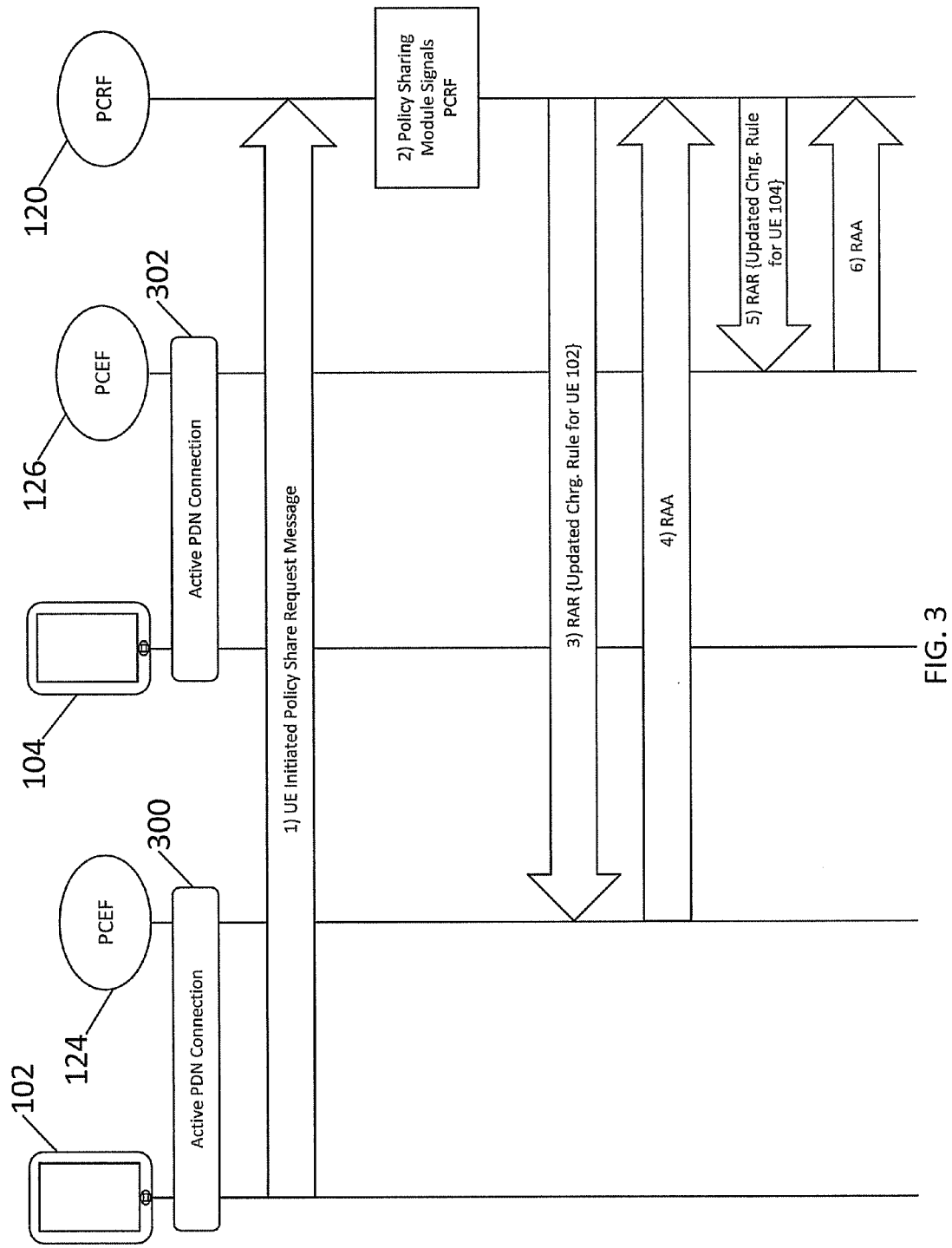
FIG. 3 is a message flow diagram illustrating an exemplary message sequence in which policy sharing is performed by a policy control function node for user controlled policy sharing according to an embodiment of the subject matter described herein.

FIG. 3 is a message flow diagram illustrating an exemplary message sequence in which policy sharing is performed by a policy control function node for user controlled policy sharing according to an embodiment of the subject matter described herein. Referring to FIG. 3, active PDN connection 300 may exist between UE 102 and PCEF node 124. Similarly, active PDN connection 302 may exist between UE 104 and PCEF node 126. As explained above with reference to FIG. 1, a user of UE 102 may desire to "share" a policy attribute associated with UE 102 (e.g., the guaranteed minimum bandwidth for streaming video from the specified provider) with UE 104, enabling UE 104's user to view the video in a satisfactory manner. At step 1, UE 102 may generate and communicate, to a policy sharing module of PCRF node 120, a UE initiated policy share request message. The policy sharing module of PCRF node 120 may receive the policy share request message and may begin the process of sharing the policy attribute requested. At step 2, the policy sharing module of PCRF node 120 may generate and communicate to policy control function(s) associated with UE 102 and UE 104 (e.g., a policy control function of PCRF node 120) a signaling message instructing the policy control function to modify the policy attribute for UE 102 and UE 104 (e.g., to decrease the guaranteed minimum bandwidth for streaming video from the specified provider for UE 102 and to increase the guaranteed minimum bandwidth for streaming video from the specified provider for UE 104). It is appreciated that the policy control function associated with UE 102 will not necessarily be the same as the policy control function associated with UE 104 (e.g., UE 102 and UE 104 may be associated with distinct PCRF nodes). In some embodiments, the policy sharing module of PCRF node 120 may take steps (not illustrated) to update accounting and/or billing records to reflect the requested policy share between UE 102 and UE 104.

The policy control function associated with UE 102 (e.g., the policy control function of PCRF node 120) may receive the signaling message and, at step 3, may generate and communicate to a policy enforcement function associated with UE 102 (e.g., PCEF node 124) a PCC rule, via for example an RAR message, that modifies the policy attribute (e.g., a rule for decreasing the guaranteed minimum bandwidth for streaming video from the specified provider for UE 102). In some embodiments the PCC rule may be configured to expire after a predetermined time period. At step 4, the policy enforcement function associated with UE 102 (e.g., PCEF node 124) may acknowledge receiving the PCC rule by generating and communicating to the policy control function associated with UE 102 (e.g., the policy control function of PCRF node 120) an acknowledgement message, for example, an RAA message.

Similarly, the policy control function associated with UE 104 (e.g., the policy control function of PCRF node 120) may receive the signaling message and, at step 5, may generate and communicate to a policy enforcement function associated with UE 104 (e.g., PCEF node 126) a PCC rule, via for example an RAR message, that modifies the policy attribute (e.g., a rule for increasing the guaranteed minimum bandwidth for streaming video from the specified provider for UE 104). In some embodiments the PCC rule may be configured to expire after a predetermined time period. At step 6, the policy enforcement function associated with UE 104 (e.g., PCEF node 126) may acknowledge receiving the PCC rule by generating and communicating to the policy control function associated with UE 104 (e.g., the policy control function of PCRF node 120) an acknowledgement message, for example, an RAA message. It is appreciated that the policy enforcement function associated with UE 102 need not be distinct from the policy enforcement function associated with UE 104 (e.g., UE 102 and UE 104 may both utilize the same PCEF node).

The policy enforcement function(s) associated with UE 102 and UE 104 (e.g., PCEF node 124 and PCEF node 126), having received PCC rules for modifying the policy attribute, may accordingly adjust the policy attribute for each of UE 102 and UE 104 as specified by the PCC rules (e.g., decrease the guaranteed minimum bandwidth for streaming video from the specified provider for UE 102 and increase the guaranteed minimum bandwidth for streaming video from the specified provider for UE 104), effectively "sharing" a policy attribute associated with UE 102 with UE 104.

Figure 4:
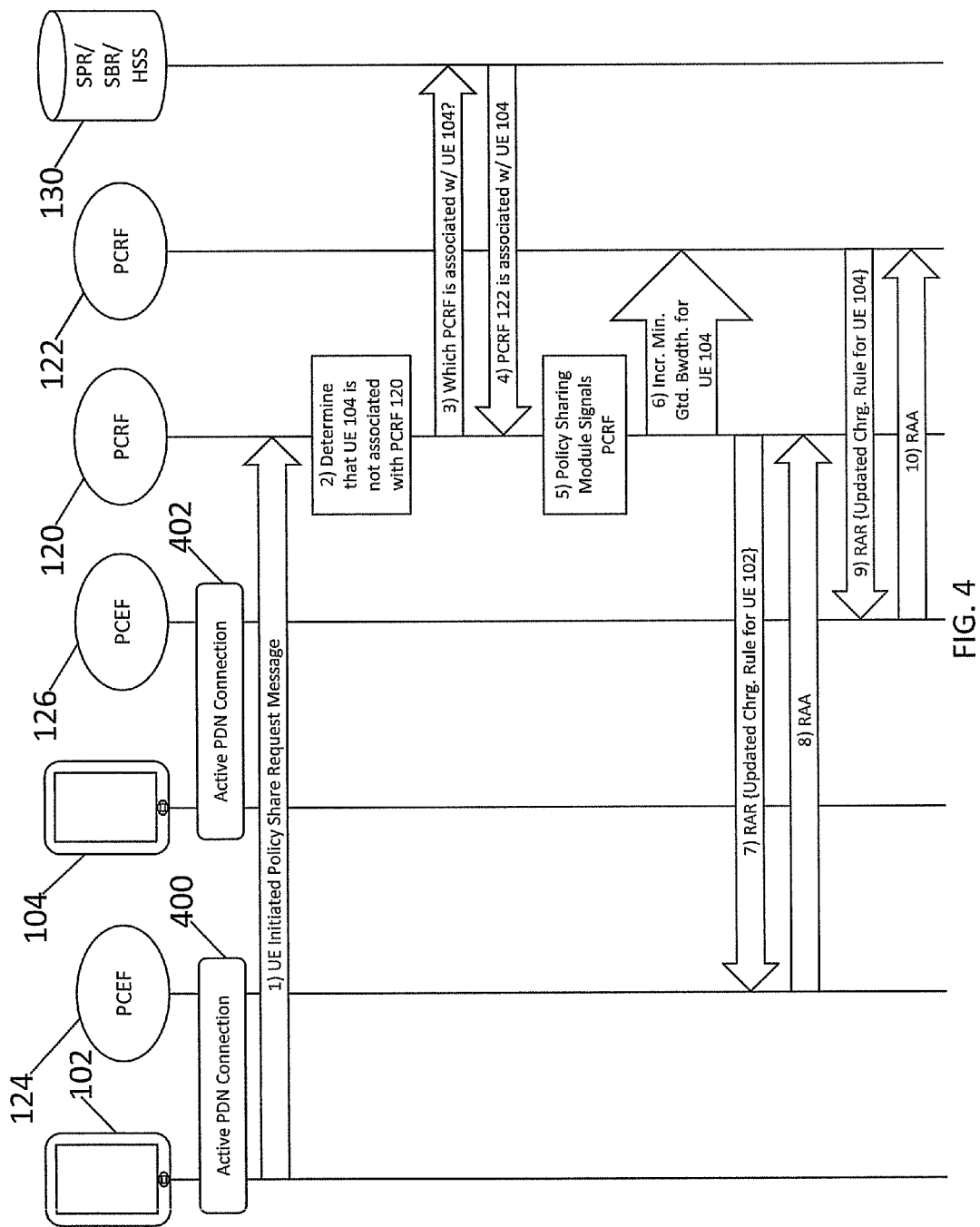
FIG. 4 is a message flow diagram illustrating an exemplary message sequence in which the sharing user devices are associated with distinct policy control function nodes and in which policy sharing is performed by one of the policy control function nodes for user controlled policy sharing according to an embodiment of the subject matter described herein.

FIG. 4 is a message flow diagram illustrating an exemplary message sequence in which the sharing user devices are associated with distinct policy control function nodes and in which policy sharing is performed by one of the policy control function nodes for user controlled policy sharing according to an embodiment of the subject matter described herein. Referring to FIG. 4, active PDN connection 400 may exist between UE 102 and PCEF node 124. Similarly, active PDN connection 402 may exist between UE 104 and PCEF node 126. As explained above with reference to FIG. 1, a user of UE 102 may desire to "share" a policy attribute associated with UE 102 (e.g., the guaranteed minimum bandwidth for streaming video from the specified provider) with UE 104, enabling UE 104's user to view the video in a satisfactory manner. At step 1, UE 102 may generate and communicate, to a policy sharing module of PCRF node 120, a UE initiated policy share request message. The policy sharing module of PCRF node 120 may receive the policy share request message and may begin the process of sharing the policy attribute requested. At step 2, the policy sharing module of PCRF node 120 may determine that UE 104 is not associated with PCRF node 120. Accordingly, the policy sharing module of PCRF node 120 may take steps to identify a policy control function associated with UE 104. For example, at step 3, the policy sharing module of PCRF node 120 may query SPR/SBR/HSS node 130 for information identifying a policy control function associated with UE 104. At step 4, SPR/SBR/HSS node 130 may respond to the query by returning information identifying a policy control function associated with UE 104 (e.g., PCRF node 122). At step 5, the policy sharing module of PCRF node 120 may generate and communicate to a policy control function associated with UE 102 (e.g., PCRF node 120) a signaling message instructing the policy control function to modify the policy attribute (e.g., to decrease the guaranteed minimum bandwidth for streaming video from the specified provider for UE 102). At step 6, the policy sharing module of PCRF node 120 may generate and communicate to a policy control function associated with UE 104 (e.g., PCRF node 122) a signaling message instructing the policy control function to modify the policy attribute (e.g., to increase the guaranteed minimum bandwidth for streaming video from the specified provider for UE 104). In some embodiments, the policy sharing module of PCRF node 120 may take steps (not illustrated) to update accounting and/or billing records to reflect the requested policy share between UE 102 and UE 104.

The policy control function associated with UE 102 (e.g., the policy control function of PCRF node 120) may receive the signaling message and, at step 7, may generate and communicate to a policy enforcement function associated with UE 102 (e.g., PCEF node 124) a PCC rule, via for example an RAR message, that modifies the policy attribute (e.g., a rule for decreasing the guaranteed minimum bandwidth for streaming video from the specified provider for UE 102). In some embodiments the PCC rule may be configured to expire after a predetermined time period. At step 8, the policy enforcement function associated with UE 102 (e.g., PCEF node 124) may acknowledge receiving the PCC rule by generating and communicating to the policy control function associated with UE 102 (e.g., the policy control function of PCRF node 120) an acknowledgement message, for example, an RAA message.

Similarly, the policy control function associated with UE 104 (e.g., PCRF node 122) may receive the signaling message and, at step 9, may generate and communicate to a policy enforcement function associated with UE 104 (e.g., PCEF node 126) a PCC rule, via for example an RAR message, that modifies the policy attribute (e.g., a rule for increasing the guaranteed minimum bandwidth for streaming video from the specified provider for UE 104). In some embodiments the PCC rule may be configured to expire after a predetermined time period. At step 10, the policy enforcement function associated with UE 104 (e.g., PCEF node 126) may acknowledge receiving the PCC rule by generating and communicating to the policy control function associated with UE 104 (e.g., PCRF node 122) an acknowledgement message, for example, an RAA message.

The policy enforcement function(s) associated with UE 102 and UE 104 (e.g., PCEF node 124 and PCEF node 126), having received PCC rules for modifying the policy attribute, may accordingly adjust the policy attribute for each of UE 102 and UE 104 as specified by the PCC rules (e.g., decrease the guaranteed minimum bandwidth for streaming video from the specified provider for UE 102 and increase the guaranteed minimum bandwidth for streaming video from the specified provider for UE 104), effectively "sharing" a policy attribute associated with UE 102 with UE 104.

Figure 5:
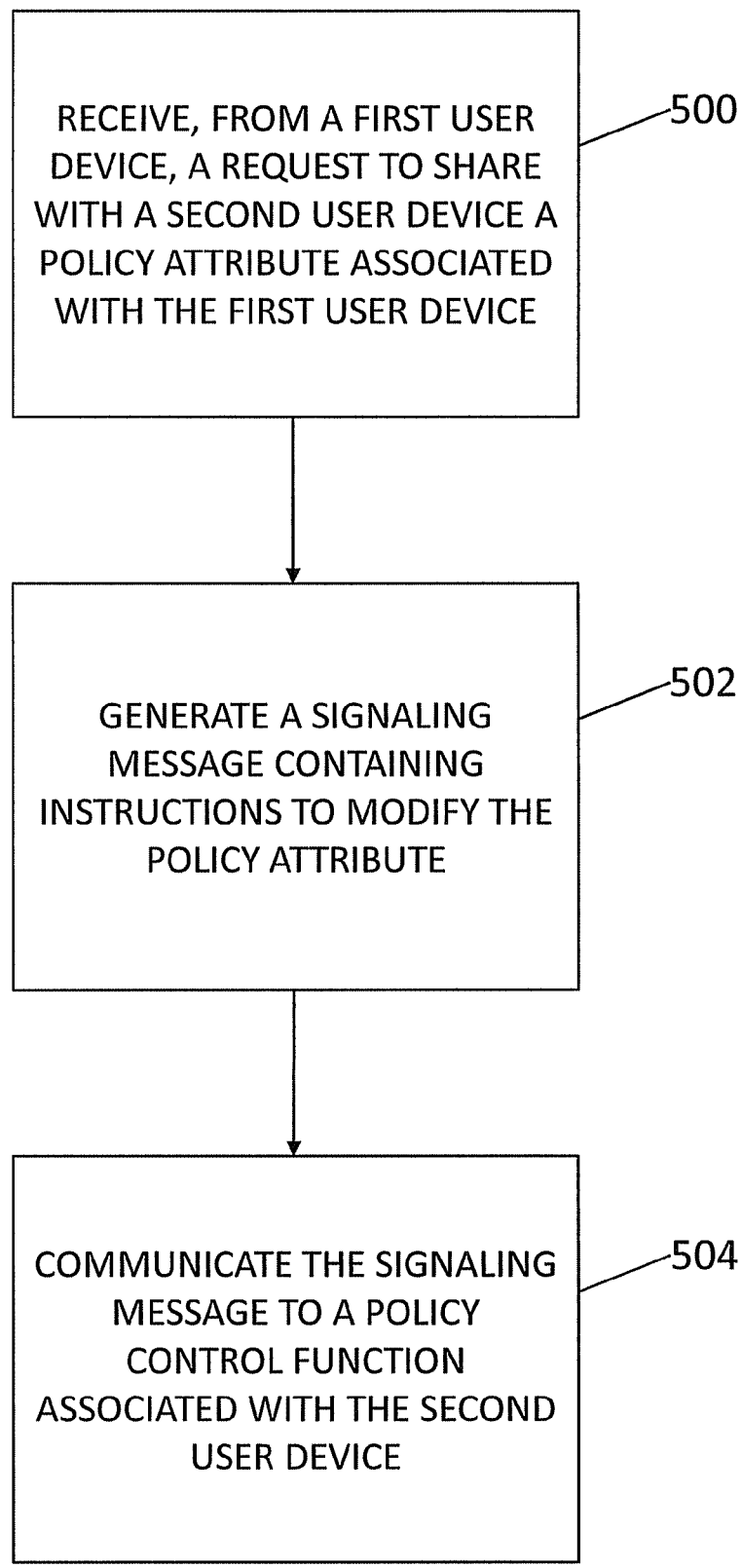
FIG. 5 is a flow chart illustrating an exemplary process for user controlled policy sharing according to an embodiment of the subject matter described herein.

FIG. 5 is a flow chart illustrating an exemplary process for user controlled policy sharing according to an embodiment of the subject matter described herein. Referring to FIG. 5, in step 500 a request to share with a second user device a policy attribute associated with a first user device is received from the first user device. For example, the policy sharing module of PCRF node 120 may receive a policy share request message from UE 102 requesting to share its guaranteed minimum bandwidth for streaming video from the specified provider with UE 104. In step 502, a signaling message containing instructions to modify the policy attribute is generated. For example, the policy sharing module of PCRF node 120 may generate a signaling message instructing a policy control function associated with UE 104 (e.g., PCRF node 120) to modify the policy attribute (e.g., to increase the guaranteed minimum bandwidth for streaming video from the specified provider for UE 104). In step 504, the signaling message is communicated to a policy control function associated with the second user device. For example, the policy sharing module of PCRF node 120 may communicate the signaling message to a policy control function associated with UE 104 (e.g., PCRF node 120).

Figure 6:
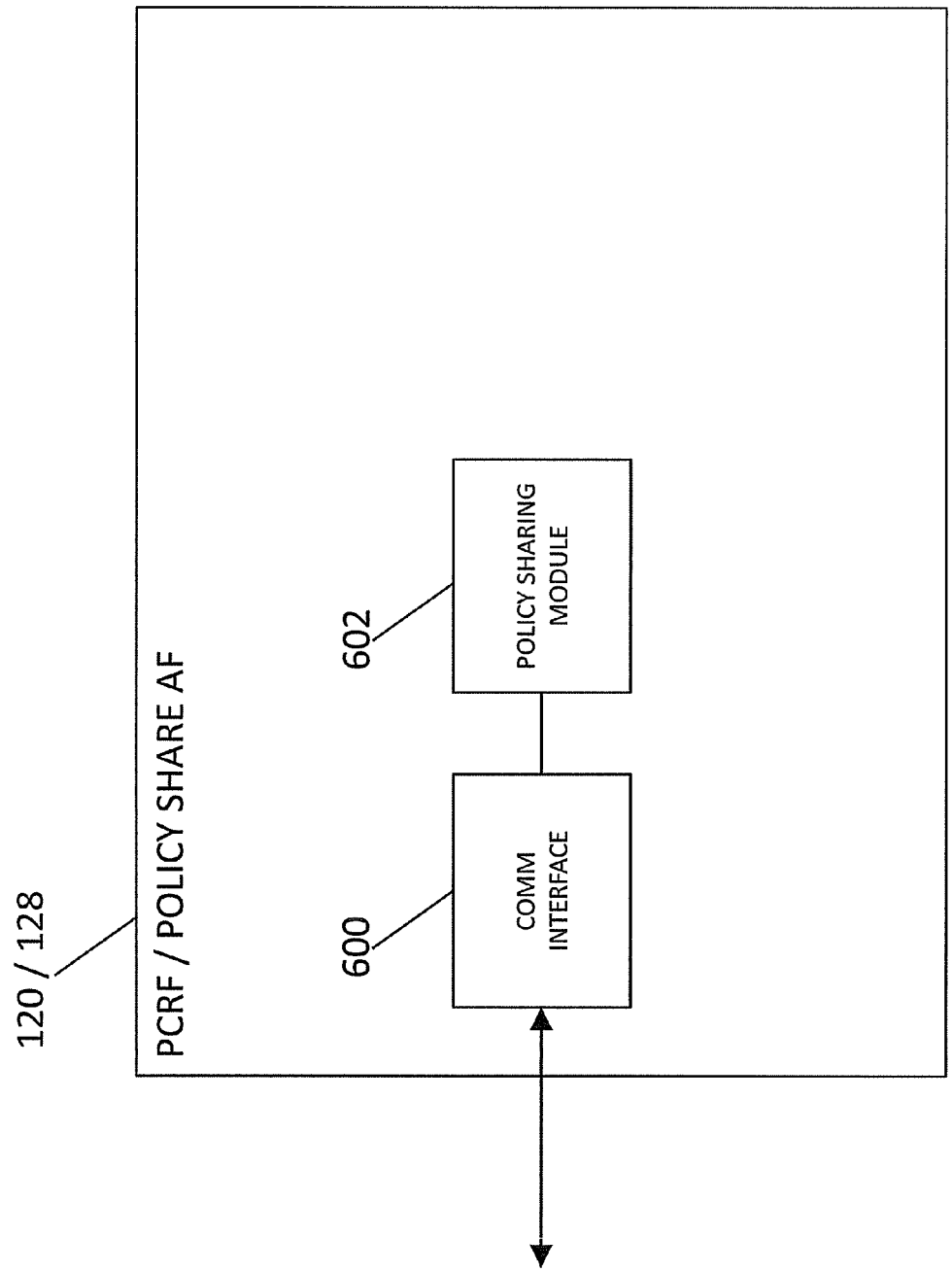
FIG. 6 is a block diagram of an exemplary policy sharing node according to an embodiment of the subject matter described herein.

FIG. 6 is a block diagram of an exemplary policy sharing node according to an embodiment of the subject matter described herein. Referring to FIG. 6, PCRF node 120 and/or policy share AF node 128 may include communication interface 600 for sending and receiving messages. Communication interface 600 may be any interface capable of sending and/or receiving messages from other nodes, functions, and/or modules. PCRF node 120 and/or policy share AF node 128 may also include policy sharing module 602. Policy sharing module 602 may be configured to receive, from a first user device and via communication interface 600, a request to share with a second user device a policy attribute associated with the first user device. For example, policy sharing module 602 may be configured to receive, via communication interface 600, a policy share request message from UE 102 requesting to share its guaranteed minimum bandwidth for streaming video from the specified provider with UE 104.

Policy sharing module 602 may also be configured to generate a signaling message containing instructions to modify the policy attribute. For example, policy sharing module 602 may be configured to generate a signaling message instructing a policy control function associated with UE 104 (e.g., PCRF node 120) to modify the policy attribute (e.g., to increase the guaranteed minimum bandwidth for streaming video from the specified provider for UE 104). Policy sharing module 602 may further be configured to communicate, via communication interface 600, the signaling message to a policy control function associated with the second user device. For example, policy sharing module 602 may be configured to communicate, via communication interface 600, the signaling message to a policy control function associated with UE 104 (e.g., PCRF node 120).

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for user controlled policy sharing, the method comprising:
   at a policy and charging rules function (PCRF):
      receiving, from a first user device, a user device initiated request to share with a second user device a policy attribute associated with the first user device;
      generating a signaling message containing instructions to modify the policy attribute; and
      communicating the signaling message to a policy control function associated with the second user device.

2. The method of claim 1 comprising:
   receiving, by the policy control function associated with the second user device, the signaling message;
   generating, by the policy control function associated with the second user device, a policy control and charging (PCC) rule that modifies the policy attribute; and
   communicating, by the policy control function associated with the second user device and to a policy enforcement function associated with the second user device, the PCC rule.

3. The method of claim 1 comprising:
   generating, by the PCRF, a PCC rule that modifies the policy attribute; and
   communicating, by the PCRF and to a policy enforcement function associated with the first user device, the PCC rule.

4. The method of claim 3 wherein the PCRF comprises at least one of an application function (AF) and a resource admission control subsystem (RAGS).

5. The method of claim 4 wherein the steps are performed at a network node that includes the at least one of the PCRF, the AF, and the RAGS.

6. The method of claim 2 wherein the policy enforcement function associated with the second user device comprises a policy control and enforcement function (PCEF).

7. The method of claim 2 wherein the PCC rule is configured to expire after a predetermined time period.

8. The method of claim 1 comprising identifying the policy control function associated with the second user device, wherein identifying the policy control function includes querying at least one of a subscription profile repository (SPR), a subscription binding repository (SBR), and a home subscriber server (HSS).

9. The method of claim 1 wherein the request comprises at least one of a short message service (SMS) message, a multimedia messaging service (MMS) message, an instant message, an email message, a Diameter message, an extensible markup language (XML) message, a session initiation protocol (SIP) message, and a simple object access protocol (SOAP) message.

10. The method of claim 1 wherein the policy attribute specifies at least one of a guaranteed download bit rate, a minimum download bit rate, a maximum download bit rate, a permitted service data flow (SDF), a permitted QoS class, a permitted access point name (APN), a permitted destination Internet protocol (IP) address, and a download quota.

11. The method of claim 1 wherein generating the signaling message comprises generating the signaling message in response to determining that at least one of the first user device and the second user device is permitted to share the policy attribute.

12. The method of claim 11 wherein determining that at least one of the first user device and the second user device is permitted to share the policy attribute comprises determining that at least one of the first user device and the second user device is associated with a predetermined network operator.

13. The method of claim 12 wherein determining that at least one of the first user device and the second user device is associated with a predetermined network operator comprises determining that at least one of a mobile network code (MNC) associated with the first user device and an MNC associated with the second user device is associated with the predetermined network operator.

14. A system for user controlled policy sharing, the system comprising:
a policy and charging rules function (PCRF) comprising:
a communication interface;
a policy sharing module implemented using a processor for executing instructions stored in a memory, wherein the policy sharing module is configured to:
receive, from a first user device and via the communication interface, a user device initiated request to share with a second user device a policy attribute associated with the first user device;
generate a signaling message containing instructions to modify the policy attribute; and
communicate, via the communication interface, the signaling message to a policy control function associated with the second user device.

15. The system of claim 14 wherein the policy control function associated with the second user device is configured to:
receive the signaling message;
generate a policy control and charging (PCC) rule that modifies the policy attribute; and
communicate, to a policy enforcement function associated with the second user device, the PCC rule.

16. The system of claim 14 wherein the PCRF is configured to:
generate a PCC rule that modifies the policy attribute; and
communicate, to a policy enforcement function associated with the first user device, the PCC rule.

17. The system of claim 16 wherein the PCRF comprises at least one of an application function (AF) and a resource admission control subsystem (RAGS).

18. The system of claim 17 wherein the PCRF is located at a network node that includes the at least one of the PCRF, the AF, and the RAGS.

19. The system of claim 15 wherein the policy enforcement function associated with the second user device comprises a policy control and enforcement function (PCEF).

20. The system of claim 15 wherein the PCC rule is configured to expire after a predetermined time period.

21. The system of claim 14 wherein the policy sharing module is configured to identify the policy control function associated with the second user device by querying at least one of a subscription profile repository (SPR), a subscription binding repository (SBR), and a home subscriber server (HSS).

22. The system of claim 14 wherein the request comprises at least one of a short message service (SMS) message, a multimedia messaging service (MMS) message, an instant message, an email message, a Diameter message, an extensible markup language (XML) message, a session initiation protocol (SIP) message, and a simple object access protocol (SOAP) message.

23. The system of claim 14 wherein the policy attribute specifies at least one of a guaranteed download bit rate, a minimum download bit rate, a maximum download bit rate, a permitted service data flow (SDF), a permitted QoS class, a permitted access point name (APN), a permitted destination Internet protocol (IP) address, and a download quota.

24. The system of claim 14 wherein the policy sharing module is configured to generate the signaling message in response to determining that at least one of the first user device and the second user device is permitted to share the policy attribute.

25. The system of claim 24 wherein determining that at least one of the first user device and the second user device is permitted to share the policy attribute comprises determining that at least one of the first user device and the second user device is associated with a predetermined network operator.

26. The system of claim 25 wherein determining that at least one of the first user device and the second user device is associated with a predetermined network operator comprises determining that at least one of a mobile network code (MNC) associated with the first user device and an MNC associated with the second user device is associated with the predetermined network operator.

27. A non-transitory computer readable medium comprising computer executable instructions that when executed by a processor of a computer control the computer to perform steps comprising:
at a policy and charging rules function (PCRF):
receiving, from a first user device, a user device initiated request to share with a second user device a policy attribute associated with the first user device;
generating a signaling message containing instructions to modify the policy attribute; and
communicating the signaling message to a policy control function associated with the second user device.

* * * * *

UNITED STATES PATENT AND TRADEMARK OFFICE
CERTIFICATE OF CORRECTION

| | | |
|---|---|---|
| PATENT NO. | : 8,903,974 B2 | Page 1 of 1 |
| APPLICATION NO. | : 13/244237 | |
| DATED | : December 2, 2014 | |
| INVENTOR(S) | : Rajagopalan et al. | |

It is certified that error appears in the above-identified patent and that said Letters Patent is hereby corrected as shown below:

Column 10, line 53
 replace "(RAGS)"
 with --(RACS)--

Column 10, line 56
 replace "RAGS"
 with --RACS--

Column 10, line 59
 replace "policy control and enforcement"
 with --policy and charging enforcement--

Column 12, line 3
 replace "(RAGS)"
 with --(RACS)--

Column 12, line 6
 replace "RAGS"
 with --RACS--

Column 12, line 9
 replace "policy control and enforcement"
 with --policy and charging enforcement--

Signed and Sealed this
Seventeenth Day of November, 2015

Michelle K. Lee
*Director of the United States Patent and Trademark Office*